(12) United States Patent
Wang et al.

(10) Patent No.: US 9,720,189 B1
(45) Date of Patent: Aug. 1, 2017

(54) OPTICAL FIBER CONNECTOR

(71) Applicant: Chen-Yueh Shih, New Taipei (TW)

(72) Inventors: Wei-Chuan Wang, New Taipei (TW); Chen-Yueh Shih, New Taipei (TW)

(73) Assignee: Chen-Yueh Shih, New Taipei (TW)

( * ) Notice: Subject to any disclaimer, the term of this patent is extended or adjusted under 35 U.S.C. 154(b) by 0 days.

(21) Appl. No.: 15/225,675

(22) Filed: Aug. 1, 2016

(30) Foreign Application Priority Data

Jan. 28, 2016 (TW) .............................. 105201298 U

(51) Int. Cl.
*G02B 6/38* (2006.01)
*G02B 6/42* (2006.01)

(52) U.S. Cl.
CPC ........... *G02B 6/3893* (2013.01); *G02B 6/387* (2013.01); *G02B 6/4261* (2013.01)

(58) Field of Classification Search
CPC .................................................. G02B 6/4261
See application file for complete search history.

(56) References Cited

U.S. PATENT DOCUMENTS

| 6,884,097 B2 * | 4/2005 | Ice ....................... G02B 6/4201 361/728 |
| 9,146,366 B2 * | 9/2015 | Koutrokois .......... G02B 6/4246 |
| 9,523,826 B2 * | 12/2016 | Tsai ....................... G02B 6/423 |

* cited by examiner

*Primary Examiner* — Omar R Rojas
(74) *Attorney, Agent, or Firm* — Chun-Ming Shih; HDLS IPR Services

(57) ABSTRACT

An optical fiber connector includes a cartridge, a latch and a pair of elastic members. The cartridge has two opposite sidewalls and a wire terminal, and each sidewall has a runner and a containing slot disposed on a side of the wire terminal. The latch includes a pull handle, a sliding member having two opposite extending arms, and a stop portion disposed at each extending arm. The pull handle is capable of rotatably connecting the sliding member, and each extending arm is slidably combined with the cartridge through each runner. Each elastic member has an end abutting each containing slot and the other end abutting each stop portion. Therefore, the space of the cartridge is increased, and the total volume of the optical fiber connector is reduced.

8 Claims, 6 Drawing Sheets

OPTICAL FIBER CONNECTOR

FIELD OF THE INVENTION

The technical field generally relates to connectors, more particularly to an optical fiber connector applied for optical fiber transmissions or signal transmissions.

BACKGROUND OF THE INVENTION

An optical fiber connector is generally used for combining electric connectors for optical fiber transmissions or signal transmissions. The combination of the electric connectors has an important characteristic of having a small volume. The smaller the volume, the smaller the space occupied by combining an equipment panel. Therefore, it is an important issue to allow more electric connectors to be installed on the same equipment panel so as to support additional message channels.

At present, there are various different specifications for photoelectric signal transmissions in the industry. For example, optical fibers have diverse specifications for combining the electric connectors, and electronic signal cables have two specifications such as UTP and BNC, so that it is necessary to change the connectors to fit different specifications. With reference to FIG. 1 for a perspective view of a conventional optical fiber connector, the conventional optical fiber connector 10 comprises a main body 20 and a pull handle 30. The pull handle 30 further includes two support arms 32 each having a stop bump 34, and the main body 20 includes two positioning slots 26 and at least one compression spring 28. The compression spring 28 is installed in the main body 20, and each positioning slot 26 is disposed on both sides of a sidewall 22, and each support arm 32 is positioned into each positioning slot 26 by each stop bump 34.

The optical fiber connector 10 pushes a socket connector (not shown in the figure) by the compression spring 28 installed in the main body 20 when the connector 10 is ejected. If the strength of the conventional compression spring 28 is insufficient, the optical fiber connector 10 of any known standards will be unable to bounce or pop. Since the compression spring 28 is installed in the main body, it occupies the installation space of other photoelectric components in the main body 20. Therefore, if it is necessary to change or replace the pull handle 30 to another different specification or pull out the pull handle 30 to install an optical fiber cable (not shown in the figure), the operation will be very inconvenient.

As the optical fiber connector 10 is designed with an increasingly smaller volume, the density of socket connectors in an electronic device also increases.

In view of the aforementioned problems of the prior art, the discloser of this disclosure based on years of experience in the related industry to conduct extensive researches and experiments, and finally provided a feasible solution to overcome the problems of the prior art.

SUMMARY OF THE INVENTION

It is a primary objective of this disclosure to provide an optical fiber connector capable of increasing the space of a cartridge and reducing the total volume of the optical fiber connector.

Another objective of this disclosure is to provide an optical fiber connector having an elastic member with a better strength.

To achieve the aforementioned and other objectives, this disclosure provides an optical fiber connector comprising a cartridge, a latch and a pair of elastic members. The cartridge has two opposite sidewalls and a wire terminal, wherein each sidewall has a runner and a containing slot disposed on a side of the wire terminal. The latch includes a pull handle, a sliding member having two opposite extending arms, and a stop portion formed on each extending arm. The pull handle is capable of rotatably connecting the sliding member, and each extending arm is slidably combined with the cartridge through each runner. Each elastic member has an end abutting each containing slot and the other end abutting each stop portion.

This disclosure has the following advantages:

The size of the second notch can be increased to accommodate a wire with a larger diameter and/or an elastic member with a larger external diameter, provided that the latch opening has a size not greater than the external periphery of the elastic member. Therefore, the strength of the elastic member is enhanced to improve the reliability and stability of the resilience of the latch while improving the convenience of operation. In addition, the extending arm of the latch includes a protruded positioning strip and a groove latched with the positioning strip, so as to prevent the latch from falling out when the cartridge is ejected from the socket connector.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

Figure 1:
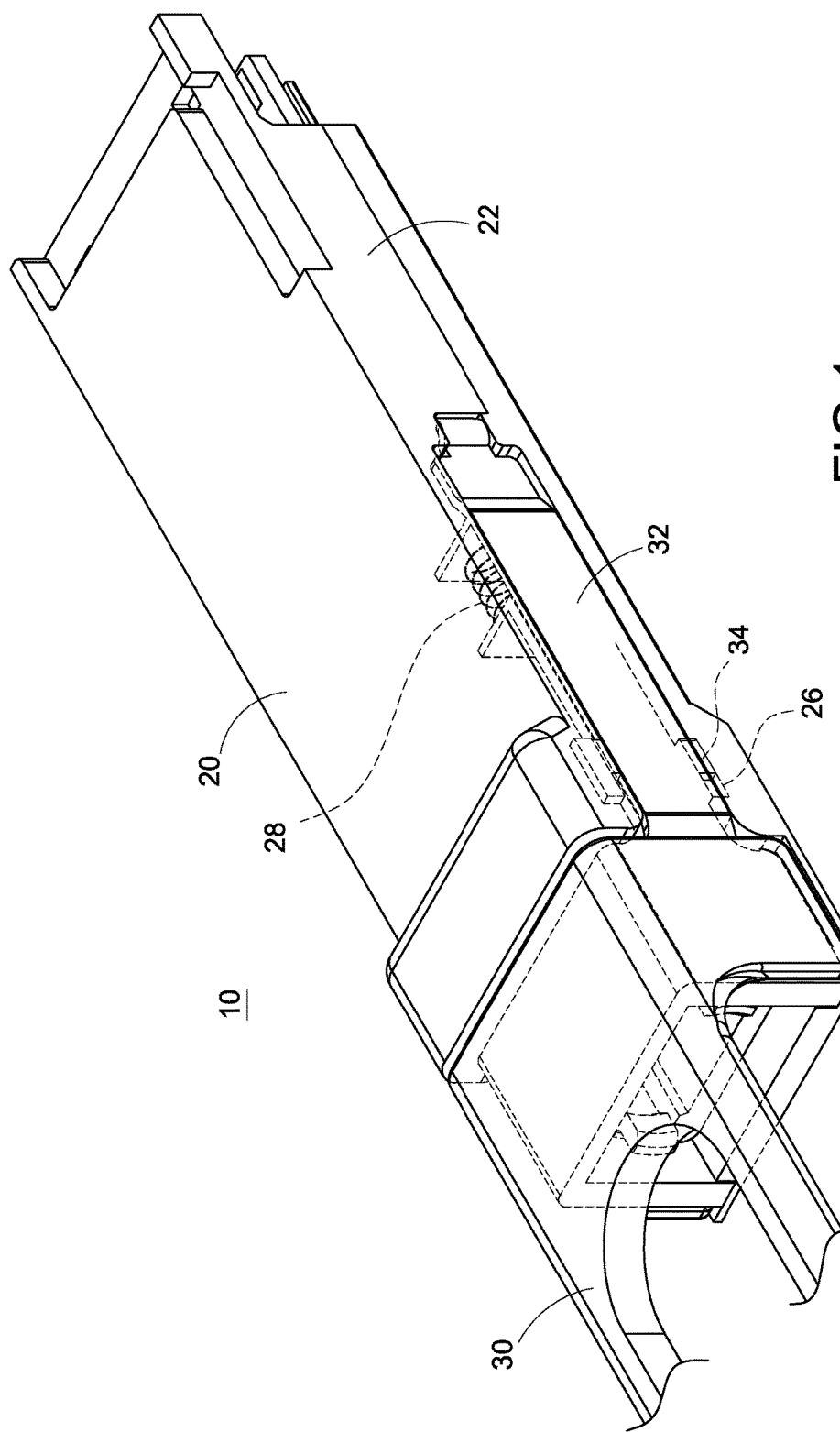
FIG. 1 is a partial perspective view of an optical fiber connector of this disclosure.
Figure 2:
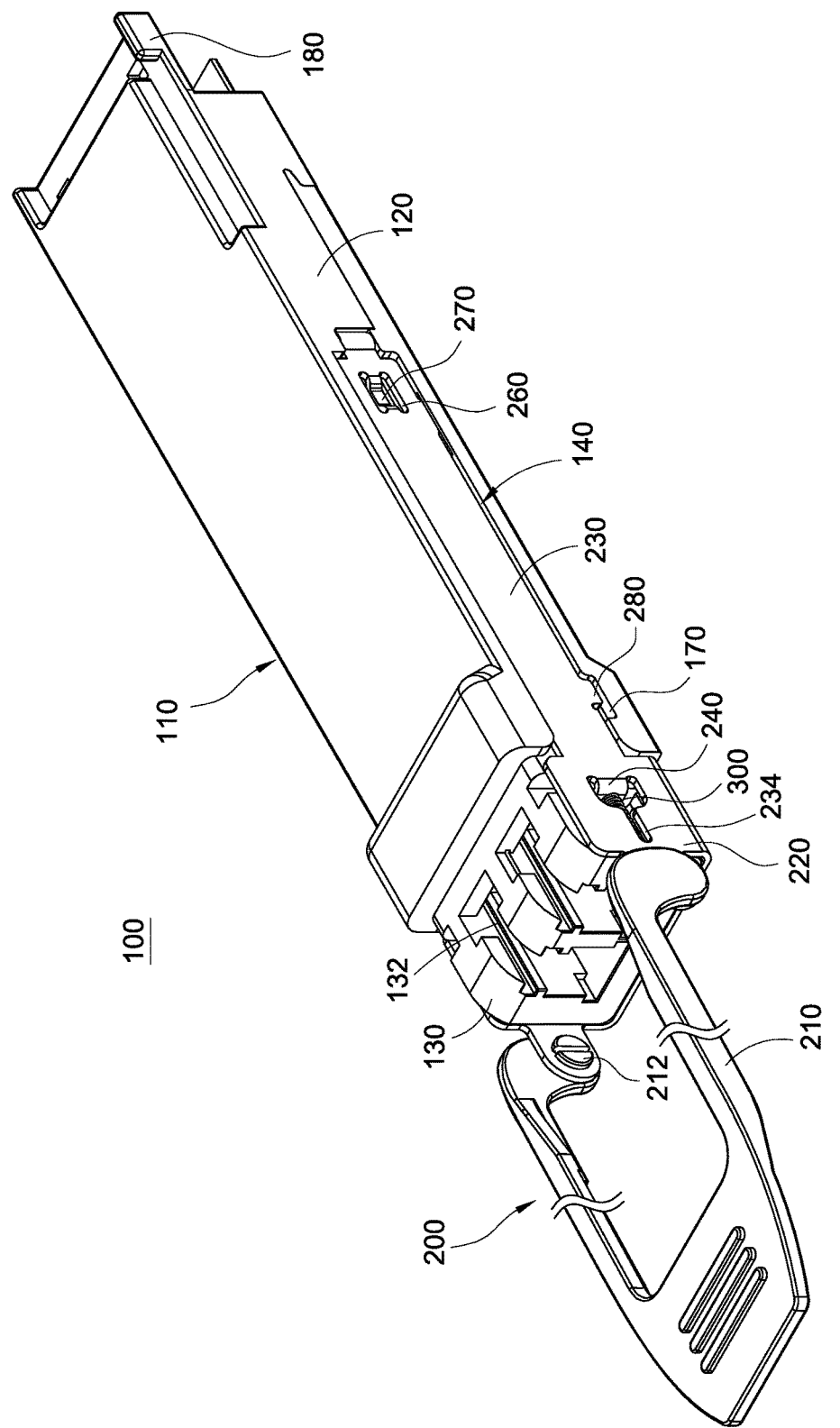
FIG. 2 is a perspective view of an optical fiber connector of this disclosure.
Figure 3:
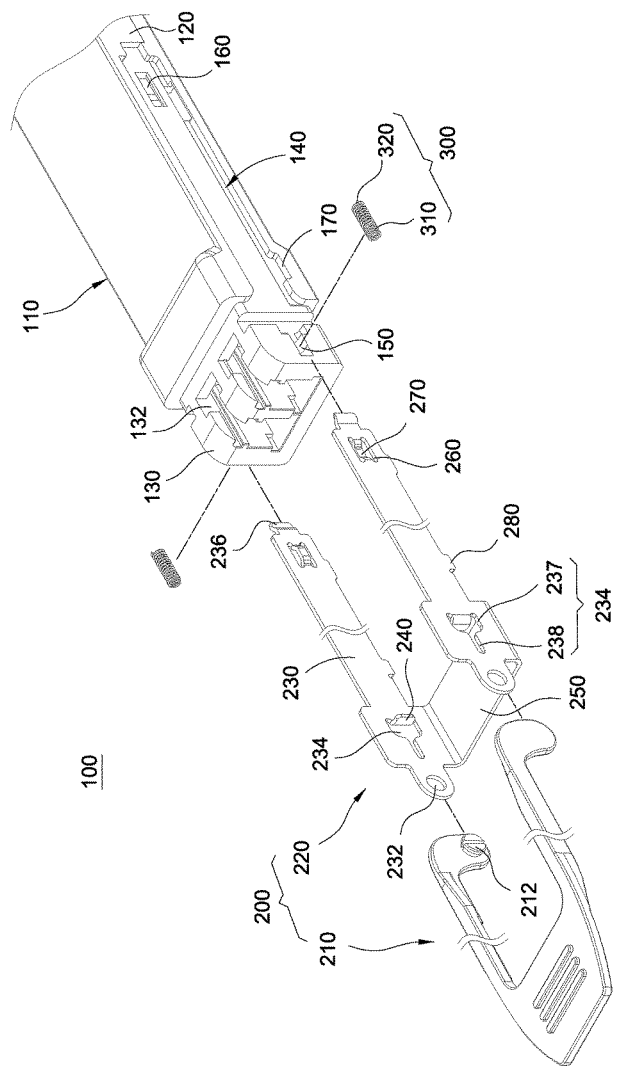
FIG. 3 is an exploded view of an optical fiber connector of this disclosure.

With reference to FIGS. 2 and 3 for an optical fiber connector 100 of this disclosure, the optical fiber connector 100 comprises a cartridge 110, a latch 200 and a pair of elastic members 300. The cartridge 110 has two opposite sidewalls 120 and a wire terminal 130, wherein each sidewall 120 has a runner 140 and a containing slot 150 formed on a side of the wire terminal 130.

The latch 200 includes a pull handle 210, a sliding member 220 having two opposite extending arms 230, and a stop portion 240 disposed at each extending arm 230. The pull handle 210 is rotatably pivoted and coupled to the sliding member 220, and each extending arm 230 is slidably combined with both sides of cartridge 110 through each runner 140. Each elastic member 300 has an end abutting each containing slot 150 and the other end abutting each stop portion 240.

Figure 4:
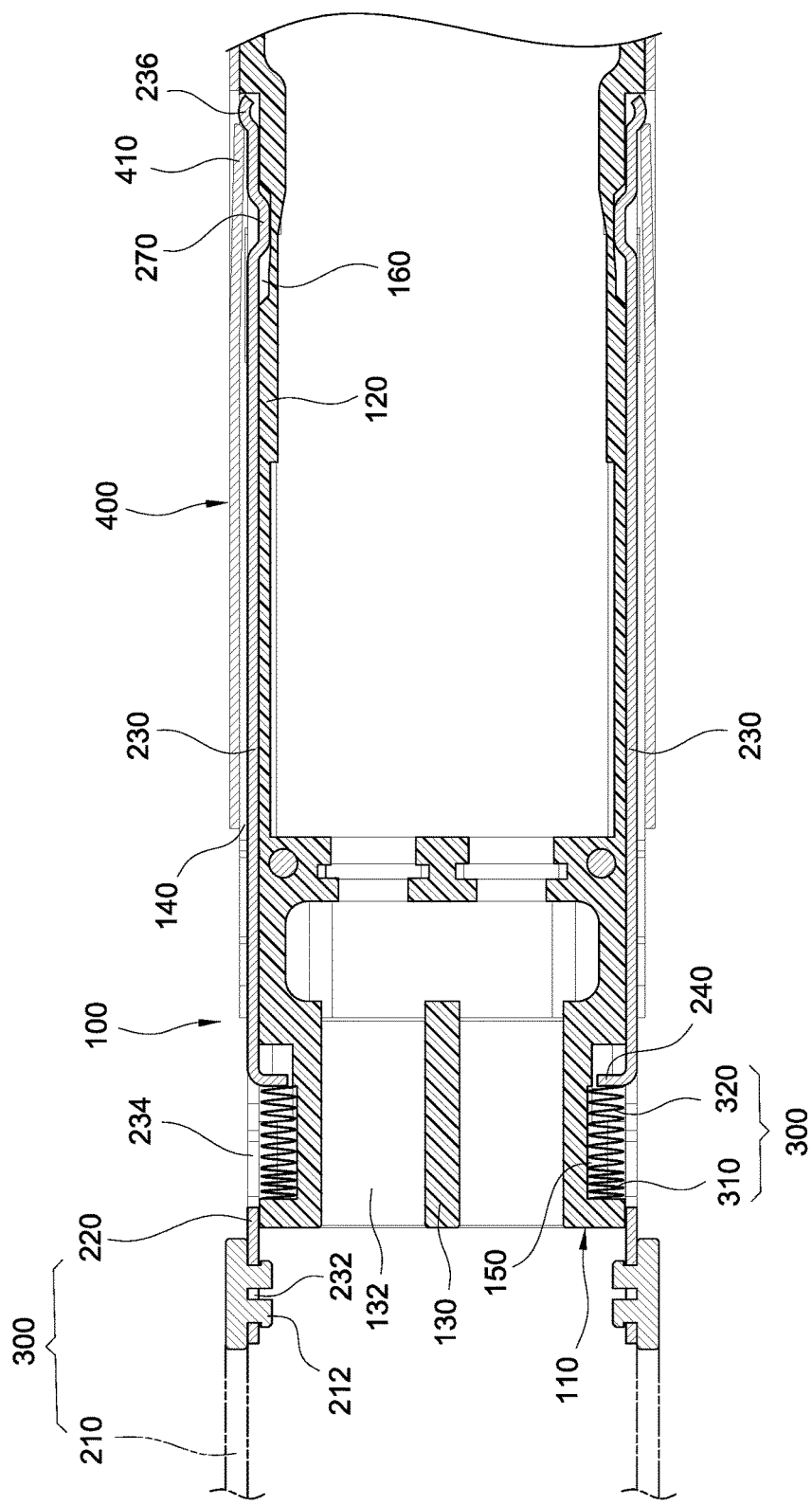
FIG. 4 is a partial cross-sectional view of an optical fiber connector of this disclosure.
Figure 5:
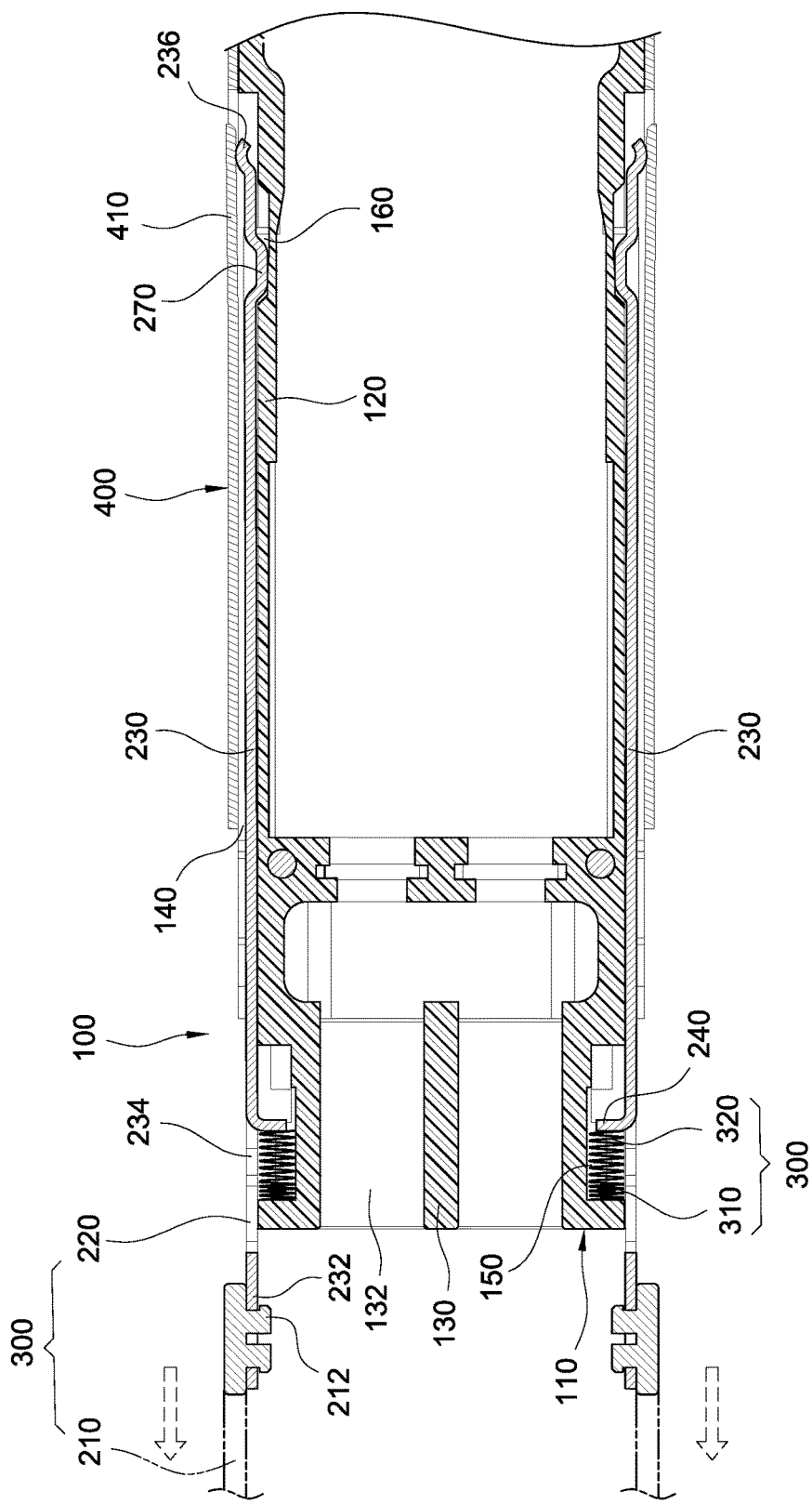
FIG. 5 is another partial cross-sectional view of an optical fiber connector of this disclosure.

In this embodiment, the elastic members 300 are preferably compression springs, but in other embodiments, the elastic member 300 may be a torque spring, a torsion bar spring or any other suitable elastic member. The compression spring further has a compact section 310 and an elastic section 320 coupled to the compact section 310, so that the elastic member 300 has a better structural rigidity. In FIGS. 4 and 5, the elastic section 320 preferably abuts an end of the containing slot 150 in a direction towards the runner 140 (in other words, the elastic section 320 abuts the stop portion 240 of each extending arm 230 to provide the restoring force of the latch 200, and the compact section 310 abuts the other end of the containing slot 150 in a direction towards the latch 200.

The pull handle 210 has a pivot 212 protruded from both ends of the pulling handle 210 separately, and each extending arm 230 of the sliding member 220 has a pivot hole 232 for pivotally coupling the pivot 212. Therefore, the pull handle 210 is capable of rotating the sliding member 220 and latching the sliding member 220 to a side of a socket connector 400 or pulling out the cartridge 110 by the sliding member 220. The sliding member 220 further includes a connecting plate 250, and each extending arm 230 has an opening 234, and the connecting plate 250 is coupled to a side of each respective extending arm 230, and the stop portion 240 is bent from a side of the opening 234 and extended into the containing slot 150, so that the stop portion 240 can move with the elastic member 300 and move in the containing slot 150.

In FIG. 3, the opening 234 further includes a first notch 237 and a second notch 238 communicating with the first notch 237, wherein the elastic member 300 has an external periphery smaller than the size of the first notch 237 but greater than the size of the second notch 238, so that the elastic member 300 can be installed into the containing slot 150 from the first notch 237 easily and latched to the second notch 238 to prevent it from falling out from the containing slot 150. Therefore, the installation of the elastic member 300 is simple, easy, and convenient.

In an embodiment as shown in FIGS. 4 and 5, the wire terminal 130 further has two wire slots 132 for plugging an optical fiber transmitting cable and an optical fiber receiving cable and a photoelectric component (not shown in the figure) in the cartridge 110, For example, the wire slots 132 are provided for electrically connecting one or more light sources, light sensors, lenses, optical devices, digital signal drivers, and optical components of a receiver circuit or a circuit board.

The optical cable connector 100 may be an optical connector of a known industry standard, and the other end of the optical connector 100 opposite to the wire terminal 130 is preferably a plug end 180 having a plurality of electric contacts (not shown in the figure). In this embodiment, any known method may be used to plug the plug end 180 of the optical connector 100 into the socket connector 400 and plug and fix the optical fiber connector 100 to the socket connector 400 by the latch 200. The socket connector 400 is generally bundled coupled to a circuit board of an electronic system (not shown in the figure) and electrically coupled to the electronic system.

Figure 6:
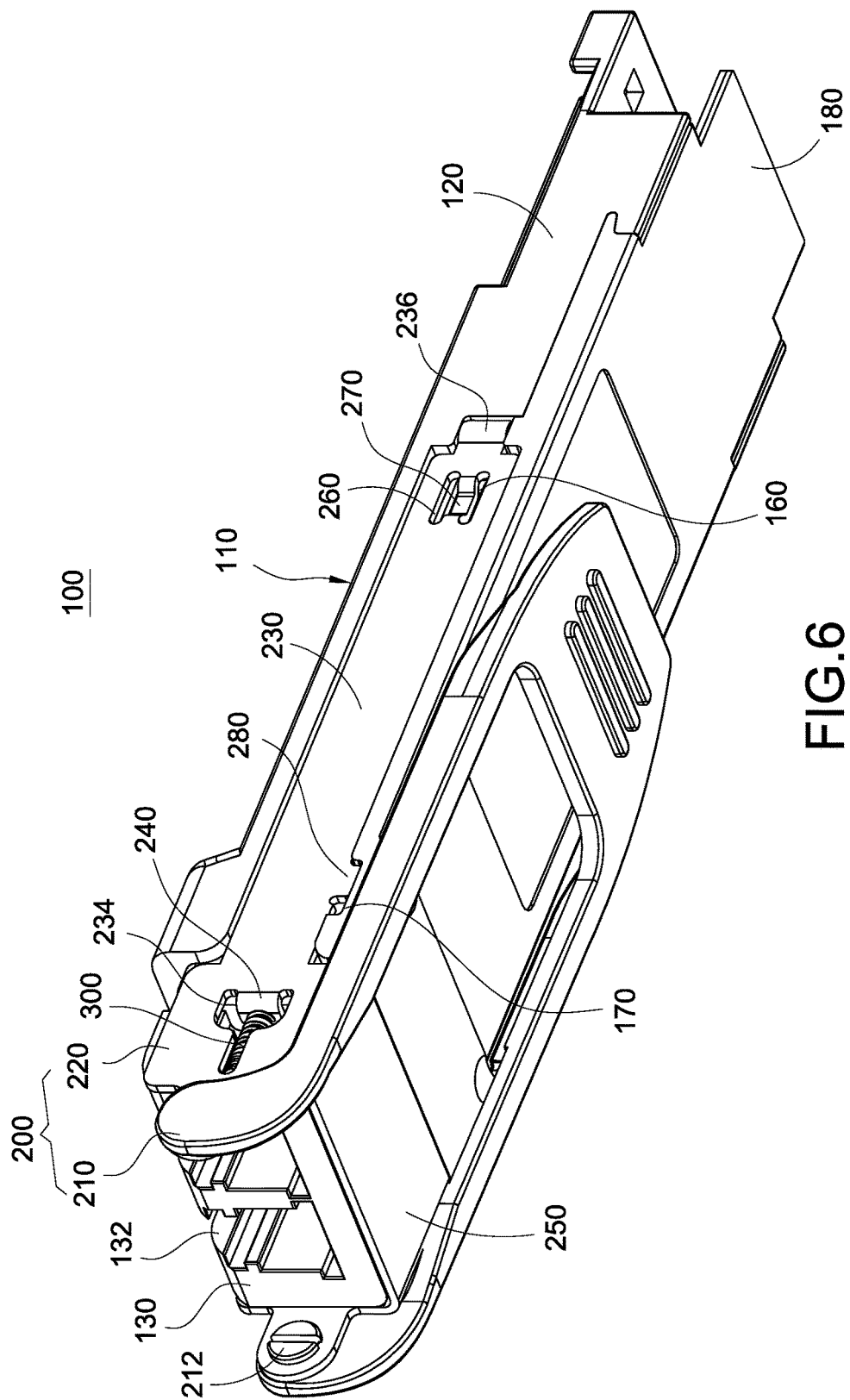
FIG. 6 is a schematic view of a latch of this disclosure rotatably folded to a side of a cartridge.

In FIG. 6, each sidewall 120 has a groove 160 formed thereon and proximately installed at an end of each runner 140, and each extending arm 230 has a broken hole 260 opposite to each groove 160 and a positioning strip 270 protruded from the broken hole 260, wherein the groove 160 preferably has a length greater than the length of the positioning strip 270, so that the positioning strip 270 can be slidably latched to the groove 160. However, the length of the groove 160 may be equal to the length of the positioning strip 270 in other embodiment and may be changed as needed.

In addition, each sidewall 120 has at least one limit slot 170 coupled to each runner 140, and a side of each extending arm 230 has at least one limit bump 280 capable of latching with the limit slot 170. The at least one limit slot 170 preferably has a length greater than the length of the at least one limit bump 280, so that the limit bump 280 of each extending arm 230 can slidably stop at the limit slot 170.

When the latch 200 is pulled out and an optical fiber cable (not shown in the figure) is installed, and it is necessary to replace or install an optical fiber connector 100 of another specification, the pull handle 210 drives the sliding member 220 to move in a direction away from the socket connector 400, so that each elastic member 300 is situated at a compressed state. Now, the elastic portion 236 at the end of each extending arm 230 props the latching portion 410, but each positioning strip 270 is slidably latched with the groove 160, so as to prevent each extending arm 230 from falling out from the socket connector 400. After the optical fiber cable is installed and the latch 200 is released, the elastic force released by the elastic member 300 resumes the sliding member 220 to its original position as shown in FIG. 4.

When it is necessary to change or replace an optical fiber connector 100 of another specification, the latch 200 is pulled out further to remove the whole optical fiber connector 100 from the socket connector 400. On the other hand, when the replaced optical fiber connector 100 is plugged to the socket connector 400, the protruding latch 200 may be rotatably stored to a side of the cartridge 110 as shown in FIG. 6 or stored to a side of the socket connector 400 to assure the safety of connecting the socket connector 400.

In this disclosure, the elastic member 300 is arranged outside the cartridge 110 and installed at the wire terminal 130, so that the cartridge 110 has a relatively larger space and the total volume of the optical fiber connector is reduced to improve increase the quantity of socket connectors of an electronic device. In addition, the size of the second notch 238 can be increased to accommodate a wire with a larger diameter and/or an elastic member 300 with a larger external diameter provided that the latch opening 234 has a size not greater than the external periphery of the elastic member 300. Therefore, the strength of the elastic member 300 is enhanced to improve the reliability and stability of the resilience of the latch 200 while improving the convenience of operation. In addition, the extending arm 230 of the latch 200 includes a protruded positioning strip 270 and a groove 160 latched with the positioning strip 270, so as to prevent the latch 200 from falling out when the cartridge 110 is ejected from the socket connector 400.

While this disclosure has been described by means of specific embodiments, numerous modifications and variations could be made thereto by those skilled in the art without departing from the scope and spirit of this disclosure set forth in the claims.

What is claimed is:
1. An optical fiber connector, comprising:
 a cartridge, having two opposite sidewalls and a wire terminal, wherein each of the sidewalls has a runner and a containing slot formed on a side of the wire terminal;
 a latch, including a pull handle, a sliding member having two opposite extending arms, and a stop portion disposed at each extending arm, and the pull handle being capable of rotat- ably coupling the sliding member, and each extending arm being slidably combined with the cartridge through each runner; and a pair of elastic members, each having an end abutting each respective containing slot and the other end abutting each respective stop portion, wherein the sliding member further includes a connecting plate, and each extending arm has an opening, and the connecting plate is coupled to a side of each extending arm, and the stop portion is bent from a side of the opening and extended into the containing slot;

wherein the opening further includes a first notch and a second notch communicating with the first notch, and the elastic member has an external periphery smaller than the size of the first notch but greater than the size of the second notch.

2. The optical fiber connector according to claim 1, wherein the elastic members are compression springs, and the compression spring has a compact section and an elastic section coupled to the compact section.

3. The optical fiber connector according to claim 2, wherein the elastic section abuts at the stop portion of the containing slot in a direction towards the runner, and the compact section abuts the other end of the containing slot in a direction towards the latch.

4. The optical fiber connector according to claim 1, wherein the pull handle has a pivot disposed at both ends of the pull handle separately, and each extending arm of the sliding member has a pivot hole for pivotably coupling the pivot.

5. The optical fiber connector according to claim 1, wherein the wire terminal further has two wire slots.

6. An optical fiber connector, comprising:

a cartridge, having two opposite sidewalls and a wire terminal, wherein each of the sidewalls has a runner and a containing slot formed on a side of the wire terminal;

a latch, including a pull handle, a sliding member having two opposite extending arms, and a stop portion disposed at each extending arm, and the pull handle being capable of rotatably coupling the sliding member, and each extending arm being slidably combined with the cartridge through each runner; and a pair of elastic members, each having an end abutting each respective containing slot and the other end abutting each respective stop portion, wherein each sidewall further has a groove proximately installed at an end of each runner, and each extending arm has a broken hole configured to be opposite to each respective groove and a positioning strip protruded from the broken hole, and the groove has a length greater than or equal to the length of the positioning strip.

7. The optical fiber connector according to claim 1, wherein each the sidewall further has at least one limit slot coupled to each runner, and a side of each extending arm has at least one limit bump capable of engaging the at least one limit slot.

8. The optical fiber connector according to claim 7, wherein the at least one limit slot has a length greater than or equal to the length of the at least one limit bump.

* * * * *